(12) United States Patent
Kim et al.

(10) Patent No.: US 8,961,344 B2
(45) Date of Patent: Feb. 24, 2015

(54) HYBRID TRANSMISSION

(71) Applicant: GM Global Technology Operations LLC, Detroit, MI (US)

(72) Inventors: Min-Joong Kim, Troy, MI (US); Norman Schoenek, Novi, MI (US); Shawn H. Swales, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 211 days.

(21) Appl. No.: 13/659,988

(22) Filed: Oct. 25, 2012

(65) Prior Publication Data
US 2014/0121053 A1    May 1, 2014

(51) Int. Cl.
*F16H 37/06*    (2006.01)

(52) U.S. Cl.
USPC .......................................................... 475/5

(58) Field of Classification Search
USPC .......................................................... 475/5
See application file for complete search history.

(56) References Cited

U.S. PATENT DOCUMENTS

| | | | |
|---|---|---|---|
| 6,579,201 B2* | 6/2003 | Bowen | 475/5 |
| 6,592,484 B1* | 7/2003 | Tsai et al. | 475/5 |
| 8,241,166 B2* | 8/2012 | Sung | 475/280 |
| 2006/0189428 A1* | 8/2006 | Raghavan et al. | 475/5 |
| 2006/0240929 A1* | 10/2006 | Raghavan et al. | 475/5 |

* cited by examiner

*Primary Examiner* — Sherry Estremsky
(74) *Attorney, Agent, or Firm* — Quinn Law Group, PLLC

(57) ABSTRACT

A transmission includes an input member, an output member, and a stationary member. First and second planetary gearsets each have respective first, second, and third members. A first motor/generator has a first rotor operatively connected to one of the members of the planetary gearsets for unitary rotation therewith. A second motor/generator has a second rotor operatively connected to one of the members of the planetary gearsets for unitary rotation therewith. The transmission also includes first, second, and third torque transmitting devices operative to selectively connect members of the planetary gearsets with the input member, the stationary member, or with other members of the planetary gearsets to provide two electric vehicle modes, two electrically variable modes, and a fixed gear ratio mode of transmission operation.

12 Claims, 1 Drawing Sheet

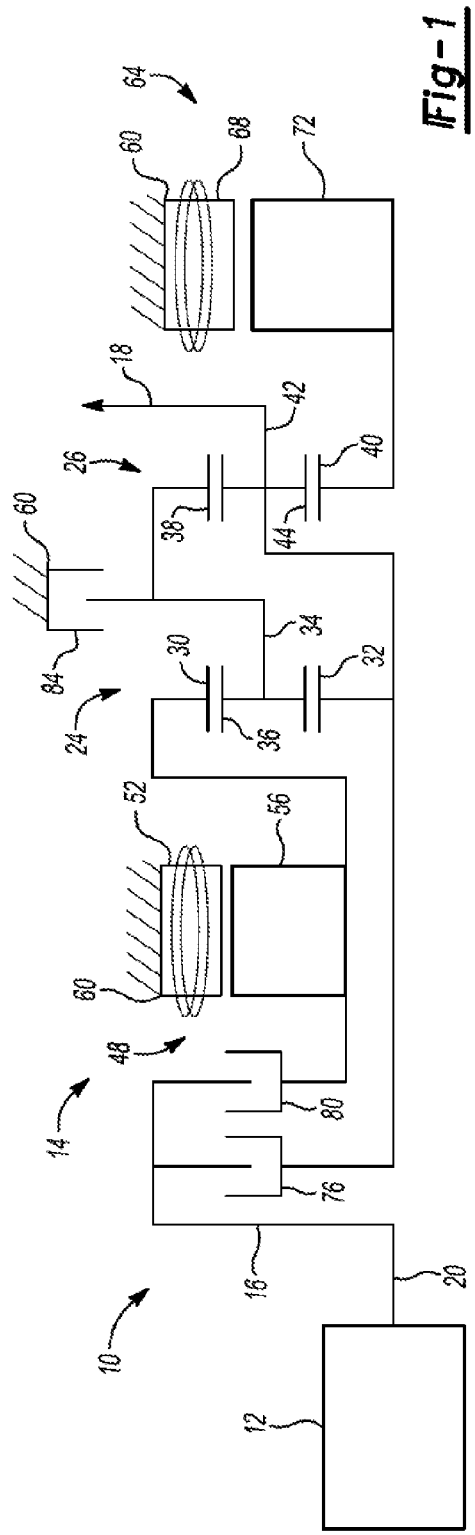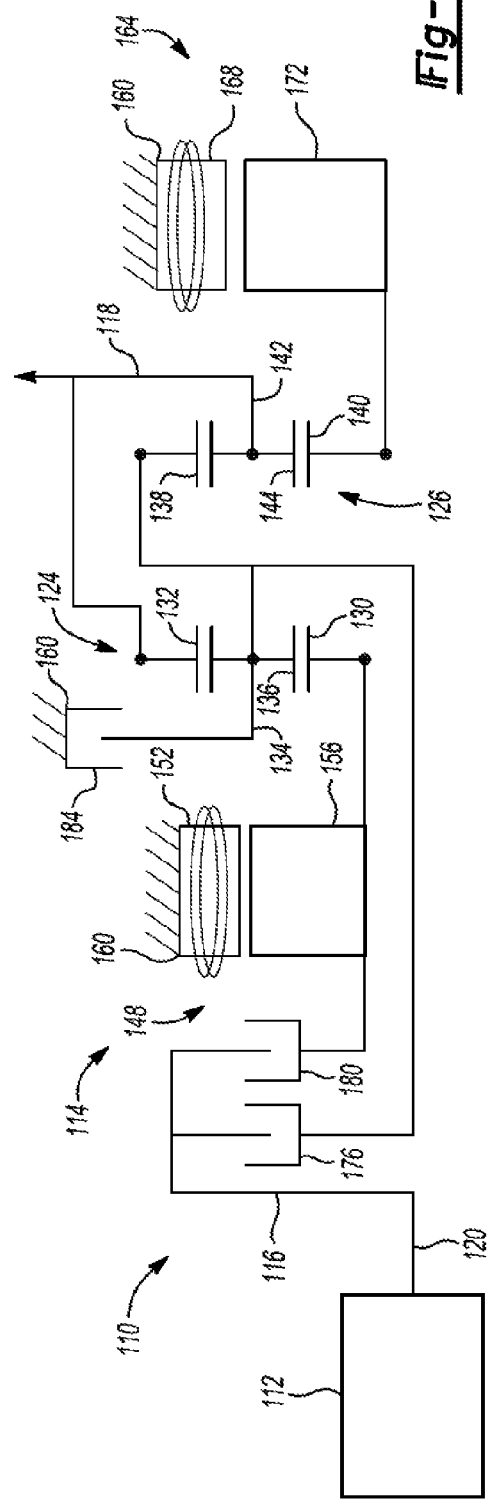

HYBRID TRANSMISSION

TECHNICAL FIELD

This invention relates to hybrid transmissions.

BACKGROUND

Electrically variable vehicle transmissions (EVTs) include an input shaft connectable to an engine, an output shaft, and a plurality of planetary gearsets each having respective first, second, and third members. EVTs also include one or more electric motor/generators. Each motor/generator is operatively connected to a respective member of one of the planetary gearsets to provide a range or mode of transmission operation characterized by a continuously variable speed ratio between the input shaft and the output shaft. The continuously variable speed ratio is proportional to the speed of one of the motor/generators.

SUMMARY

A transmission includes an input member, an output member, and a stationary member. First and second planetary gearsets each have respective first, second, and third members. A first motor/generator has a first rotor operatively connected to one of the members of the planetary gearsets for unitary rotation therewith. A second motor/generator has a second rotor operatively connected to one of the members of the planetary gearsets for unitary rotation therewith.

The transmission also includes first, second, and third torque transmitting devices operative to selectively connect members of the planetary gearsets with the input member or the stationary member. The torque transmitting devices are engageable in various combinations to provide two electric vehicle modes, two electrically variable modes, and a fixed gear ratio mode of transmission operation.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic depiction of a powertrain including a transmission in accordance with the claimed invention; and FIG. 2 is a schematic depiction of another powertrain including another transmission embodiment in accordance with the claimed invention.

DETAILED DESCRIPTION

Referring to FIG. 1, a vehicle powertrain 10 is schematically depicted. The powertrain 10 includes an engine 12 and a transmission 14. The transmission 14 includes an input member 16 and an output member 18. The input member 16 is operatively connected to the crankshaft 20 of the engine 12 through a powertrain damper/isolator (not shown) to receive torque therefrom. The output member 18 is operatively connected to the vehicle's drive wheels (not shown) to transmit torque thereto via a differential assembly (not shown). The transmission 14 also includes first and second planetary gearsets 24, 26.

Each of the planetary gearsets 24, 26 includes respective first, second, and third members. In the embodiment depicted, the first member of the first planetary gearset 24 is a first ring gear member 30, the second member of the first planetary gearset 24 is a first sun gear member 32, and the third member of the first planetary gearset 24 is a first planet carrier member 34. The first planetary gearset 24 includes at least one pinion gear 36 that is rotatably connected to the planet carrier member 34, and that is meshingly engaged with both the ring gear member 30 and the sun gear member 32.

In the embodiment depicted, the first member of the second planetary gearset 26 is a second ring gear member 38, the second member of the second planetary gearset 26 is a second sun gear member 40, and the third member of the second planetary gearset 26 is a second planet carrier member 42. The second planetary gearset 26 includes at least one pinion gear 44 that is rotatably connected to the planet carrier member 42, and that is meshingly engaged with both the ring gear member 38 and the sun gear member 40.

A first motor/generator 48 includes a first stator 52 and a first rotor 56. The first stator 52 is mounted to a stationary member, such as the transmission housing 60. A second motor/generator 64 includes a second stator 68 and a second rotor 72. The second stator 68 is mounted to a stationary member, such as the transmission housing 60. The first and second motor/generators 48, 64 are operatively connected to a battery (not shown). When either of the motor/generators 48, 64 operates as a generator, it transmits electrical energy to the battery to charge the battery or to power the other motor/generator. When either of the motor/generators 48, 64 operates as a motor, it receives electrical energy from the battery or from the other motor/generator.

The first rotor 56 is continuously operatively connected to ring gear member 30 for unitary rotation therewith. The planet carrier 34 of the first planetary gearset 24 is continuously operatively connected to the ring gear member 38 of the second planetary gearset 26 for unitary rotation therewith. The second rotor 72 is continuously operatively connected to the sun gear member 40 of the second planetary gearset 26 for unitary rotation therewith. The sun gear member 32 of the first planetary gearset 24, the planet carrier member 42 of the second planetary gearset 26, and the output member 18 are continuously operatively interconnected for unitary rotation.

It should be noted that, where used in the claims, first, second, and third members of planetary gearsets do not necessarily refer to a member of a particular type; thus, for example, a first member may be any one of a ring gear member, sun gear member, or planet carrier member.

The transmission 14 includes three selectively engageable torque transmitting devices 76, 80, 84. A first torque transmitting device 76 is a clutch that is configured to selectively couple the input member 16 to the sun gear member 32 and the planet carrier member for unitary rotation. A second torque transmitting device 80 is a clutch that is configured to selectively couple the input member 16 to the first rotor 56 and the first ring gear member 30 for unitary rotation. A third torque transmitting device 84 is a brake that is configured to selectively couple the first planet carrier member 34 and the second ring gear member 38 to the stationary member, i.e., housing 60.

Those skilled in the art will recognize that only a portion of the transmission 14 above the input member 16 is shown schematically; and portions of the planetary gear sets 24, 26, torque transmitting devices 76, 80, 84 and other components generally symmetrical about the input member 16 are not shown.

A first mode of transmission operation is achieved when the third torque transmitting device 84 is engaged and the first and second torque transmitting devices 76, 80 are disengaged. The first mode of transmission operation is a low speed, fixed gear, electric vehicle (EV) mode. An EV mode is one in which there is no mechanical connection between the input member 16 and the output member 18 and thus all of the power to the output member 18 is supplied by one or more of the motor/generators 48, 64 powered by a battery (not shown) and not the engine 12.

A second mode of transmission operation is achieved when all of the torque transmitting devices 76, 80, 84 are disengaged. The second mode of transmission operation is a high speed, pseudo-gear, EV mode. A third mode of transmission operation is achieved when the second torque transmitting device 80 is engaged and the first and third torque transmitting devices 76, 84 are disengaged. The third mode of transmission operation is an EVT output split mode that may be used for reverse launch or performance. An electrically variable, or EVT, mode of operation is characterized by a continuously variable speed ratio between the input shaft 16 and the output shaft 18 that is proportional to the speed of one or more of the motor/generators 48, 64.

A fourth mode of transmission operation is achieved when the first torque transmitting device 76 is engaged and the second and third torque transmitting devices 80, 84 are disengaged. The fourth mode of transmission operation is an EVT compound split mode. A fifth, reverse mode is achieved when the second and third torque transmitting 80, 84 devices are engaged and the first torque transmitting device 76 is disengaged. A sixth, fixed gear, mode of operation is achieved when the first and second torque transmitting devices 76, 80 are engaged and the third torque transmitting device 84 is disengaged.

The second mode of transmission operation, i.e., the high speed, pseudo-gear, EV mode, may provide a better EV range during highway driving than prior art transmissions. The fourth mode, i.e., the compound split mode, may result in improved fuel economy during charge sustaining than prior art transmissions. The fifth mode, i.e., the reverse gear mode, may provide improved reverse gradeability than prior art transmissions. The first and second clutches 76, 80 in the embodiment depicted are dry clutches to minimize impact on spin loss, and may share the low-flow hydraulics used to actuate the third torque transmitting device 84. The configuration of the transmission 14 enables one or both of the motor/generators 48, 64 to be "off axis," i.e., the rotors 56, 72 may rotate about axes different from the axis about which the input member 16 and the members of the gearsets 24, 26 rotate.

Referring to FIG. 2, another vehicle powertrain 110 is schematically depicted. The powertrain 110 includes an engine 112 and a transmission 114. The transmission 114 includes an input member 116 and an output member 118. The input member 116 is operatively connected to the crankshaft 120 of the engine 112 through a powertrain damper/isolator (not shown) to receive torque therefrom. The output member 118 is operatively connected to the vehicle's drive wheels (not shown) to transmit torque thereto via a differential assembly (not shown). The transmission 114 also includes first and second planetary gearsets 124, 126.

Each of the planetary gearsets 124, 126 includes respective first, second, and third members. In the embodiment depicted, the first member of the first planetary gearset 124 is a first sun gear member 130, the second member of the first planetary gearset 124 is a first ring gear member 132, and the third member of the first planetary gearset 124 is a first planet carrier member 134. The first planetary gearset 124 includes at least one pinion gear 136 that is rotatably connected to the planet carrier member 134, and that is meshingly engaged with both the sun gear member 130 and the ring gear member 132.

In the embodiment depicted, the first member of the second planetary gearset 126 is a second ring gear member 138, the second member of the second planetary gearset 126 is a second sun gear member 140, and the third member of the second planetary gearset 126 is a second planet carrier member 142. The second planetary gearset 126 includes at least one pinion gear 144 that is rotatably connected to the planet carrier member 142, and that is meshingly engaged with both the ring gear member 138 and the sun gear member 140.

A first motor/generator 148 includes a first stator 152 and a first rotor 156. The first stator 152 is mounted to a stationary member, such as the transmission housing 160. A second motor/generator 164 includes a second stator 168 and a second rotor 172. The second stator 168 is mounted to a stationary member, such as the transmission housing 160. The first and second motor/generators 148, 164 are operatively connected to a battery (not shown). When either of the motor/generators 148, 164 operates as a generator, it transmits electrical energy to the battery to charge the battery or to power the other motor/generator. When either of the motor/generators 148, 164 operates as a motor, it receives electrical energy from the battery or from the other motor/generator.

The first rotor 156 is continuously operatively connected to the first sun gear member 130 for unitary rotation therewith. The planet carrier 134 of the first planetary gearset 124 is continuously operatively connected to the second ring gear member 138 of the second planetary gearset 126 for unitary rotation therewith. The second rotor 172 is continuously operatively connected to the sun gear member 140 of the second planetary gearset 126 for unitary rotation therewith. The ring gear member 132 of the first planetary gearset 124, the planet carrier member 142 of the second planetary gearset 126, and the output member 118 are continuously operatively interconnected for unitary rotation.

The transmission 114 includes three selectively engageable torque transmitting devices 176, 180, 184. A first torque transmitting device 176 is a clutch that is configured to selectively couple the input member 116 to the first planet carrier member 134 and the second ring gear member 138 for unitary rotation. A second torque transmitting device 180 is a clutch that is configured to selectively couple the input member 116 to the first rotor 156 and the first sun gear member 130 for unitary rotation. A third torque transmitting device 184 is a brake that is configured to selectively couple the first planet carrier member 134 and the second ring gear member 138 to the stationary member, i.e., housing 160.

While the best modes for carrying out the invention have been described in detail, those familiar with the art to which this invention relates will recognize various alternative designs and embodiments for practicing the invention within the scope of the appended claims.

The invention claimed:
1. A transmission comprising:
an input member; a stationary member;
first and second planetary gearsets each having respective first, second, and third members;
an output member operatively connected to one of the members of the planetary gearsets for unitary rotation therewith;
a first motor/generator having a first rotor operatively connected to one of the members of the planetary gearsets for unitary rotation therewith;

a second motor/generator having a second rotor operatively connected to one of the members of the planetary gearsets for unitary rotation therewith; and first, second, and third torque transmitting devices operative to selectively connect members of said planetary gearsets with said input member or said stationary member to provide two electric vehicle modes, two electrically variable modes, and a fixed gear ratio mode of transmission operation.

2. The transmission of claim 1, wherein the first member of the first planetary gearset is operatively connected to the first rotor for unitary rotation therewith;

wherein the second member of the first planetary gearset is operatively connected to the third member of the second planetary gearset and the output member for unitary rotation therewith;

wherein the third member of the first planetary gearset is operatively connected to the first member of the second planetary gearset for unitary rotation therewith; and wherein the second member of the second planetary gearset is operatively connected to the second rotor for unitary rotation therewith.

3. The transmission of claim 2, wherein the first torque transmitting device is configured to selectively couple the input member to the second member of the first planetary gearset and the third member of the second planetary gearset for unitary rotation;

wherein the second torque transmitting device is configured to selectively couple the input member to the first rotor and the first member of the first planetary gearset for unitary rotation; and wherein the third torque transmitting device is configured to selectively couple the third member of the first planetary gearset and the first member of the second planetary gearset to the stationary member.

4. The transmission of claim 3, wherein the first member of the first planetary gearset is a first ring gear member;

wherein the second member of the first planetary gearset is a first sun gear member; and wherein the third member of the first planetary gearset is a first planet carrier member.

5. The transmission of claim 4, wherein the first member of the second planetary gearset is a second ring gear member;

wherein the second member of the second planetary gearset is a second sun gear member; and wherein the third member of the second planetary gearset is a second planet carrier member.

6. The transmission of claim 2, wherein the first torque transmitting device is configured to selectively couple the input member to the third member of the first planetary gearset and the first member of the second planetary gearset for unitary rotation;

wherein the second torque transmitting device is configured to selectively couple the input member to the first rotor and the first member of the first planetary gearset for unitary rotation; and wherein the third torque transmitting device is configured to selectively couple the third member of the first planetary gearset and the first member of the second planetary gearset to the stationary member.

7. The transmission of claim 6, wherein the first member of the first planetary gearset is a first sun gear member;

wherein the second member of the first planetary gearset is a first ring gear member; and wherein the third member of the first planetary gearset is a first planet carrier member.

8. The transmission of claim 7, wherein the first member of the second planetary gearset is a second ring gear member;

wherein the second member of the second planetary gearset is a second sun gear member; and wherein the third member of the second planetary gearset is a second planet carrier member.

9. A transmission comprising:

an input member; an output member; and a stationary member;

first and second planetary gearsets each having respective first, second, and third members;

a first motor/generator having a first rotor;

a second motor/generator having a second rotor;

said first member of the first planetary gearset being operatively connected to the first rotor for unitary rotation therewith;

said second member of the first planetary gearset being operatively connected to the third member of the second planetary gearset and the output member for unitary rotation therewith;

said third member of the first planetary gearset being operatively connected to the first member of the second planetary gearset for unitary rotation therewith;

said second member of the second planetary gearset being operatively connected to the second rotor for unitary rotation therewith;

first, second, and third torque transmitting devices operative to selectively connect members of said planetary gearsets with said input member or said stationary member;

wherein the first torque transmitting device is configured to selectively couple the input member to the second member of the first planetary gearset and the third member of the second planetary gearset for unitary rotation;

wherein the second torque transmitting device is configured to selectively couple the input member to the first rotor and the first member of the first planetary gearset for unitary rotation; and wherein the third torque transmitting device is configured to selectively couple the third member of the first planetary gearset and the first member of the second planetary gearset to the stationary member.

10. The transmission of claim 9, wherein the first member of the first planetary gearset is a first ring gear member;

wherein the second member of the first planetary gearset is a first sun gear member; and wherein the third member of the first planetary gearset is a first planet carrier member.

11. The transmission of claim 10, wherein the first member of the second planetary gearset is a second ring gear member;

wherein the second member of the second planetary gearset is a second sun gear member; and wherein the third member of the second planetary gearset is a second planet carrier member.

12. A transmission comprising:

an input member; a stationary member;

first and second planetary gearsets each having respective first, second, and third members;

an output member operatively connected to one of the members of the planetary gearsets for unitary rotation therewith;

a first motor/generator having a first rotor operatively connected to one of the members of the planetary gearsets for unitary rotation therewith;

a second motor/generator having a second rotor operatively connected to one of the members of the planetary gearsets for unitary rotation therewith; and first, second, and third torque transmitting devices operative to selectively connect members of said planetary gearsets with said input member or said stationary member to provide two electric vehicle modes, two electrically variable modes, a fixed gear ratio mode, and a reverse gear mode of transmission operation.

* * * * *